United States Patent
Slusarczyk et al.

(10) Patent No.: US 9,217,484 B2
(45) Date of Patent: Dec. 22, 2015

(54) AMPLITUDE SENSITIVE HYDRAULIC DAMPER

(75) Inventors: Pawel Slusarczyk, Myslenice (PL);
Janusz Goldasz, Cracow (PL);
Zbigniew Szklarz, Zator (PL)

(73) Assignee: Beijing West Industries, Beijing (CN)

( * ) Notice: Subject to any disclaimer, the term of this patent is extended or adjusted under 35 U.S.C. 154(b) by 0 days.

(21) Appl. No.: 14/236,753

(22) PCT Filed: Mar. 27, 2012

(86) PCT No.: PCT/CN2012/073145
§ 371 (c)(1),
(2), (4) Date: Feb. 3, 2014

(87) PCT Pub. No.: WO2013/143073
PCT Pub. Date: Oct. 3, 2013

(65) Prior Publication Data
US 2015/0047936 A1  Feb. 19, 2015

(51) Int. Cl.
*F16F 9/512* (2006.01)
(52) U.S. Cl.
CPC ............... *F16F 9/512* (2013.01); *F16F 9/5126* (2013.01)
(58) Field of Classification Search
CPC ......... F16F 9/165; F16F 9/504; F16F 9/5126; F16F 9/512
See application file for complete search history.

(56) References Cited

U.S. PATENT DOCUMENTS

| | | | |
|---|---|---|---|
| 2,717,058 A | 9/1955 | Brundrett | |
| 3,180,453 A * | 4/1965 | Yoshiro | 188/280 |
| 3,570,635 A * | 3/1971 | Takagi | 188/280 |
| 5,168,965 A | 12/1992 | Huang | |
| 5,248,014 A * | 9/1993 | Ashiba | 188/282.8 |
| 5,570,762 A * | 11/1996 | Jentsch et al. | 188/322.15 |
| 7,156,214 B2 | 1/2007 | Pradel et al. | |
| 2011/0101579 A1* | 5/2011 | Polakowski et al. | 267/64.26 |
| 2012/0305352 A1* | 12/2012 | Yu et al. | 188/275 |
| 2013/0240765 A1* | 9/2013 | Park | 251/62 |

FOREIGN PATENT DOCUMENTS

| | | |
|---|---|---|
| CN | 2542887 | 4/2003 |
| EP | 0207409 | 1/1987 |

OTHER PUBLICATIONS

International Search Report, Jan. 3, 2013, 3 pages.

\* cited by examiner

*Primary Examiner* — Bradley King
(74) *Attorney, Agent, or Firm* — Dickinson Wright PLLC (57) ABSTRACT

A hydraulic damper (2) includes a slidable piston assembly (4) attached to a piston rod (6) to form at least one valve assembly of the damper. The damper further includes at least one chamber in which a slidable partition assembly (54) separates this chamber into an additional compression chamber (101) hydraulically connected with a main compression chamber (10) and an additional rebound chamber (91) hydraulically connected with a main rebound chamber (9, 09). The slidable partition assembly (54) comprises a piston (541) making a sliding fit with an inner surface of the chamber and at least one spring (543) supporting the piston (541). The slidable partition assembly (54) additionally comprises at least one internal piston (542) disposed slidably within the external piston (541) and supported by an internal spring (544) disposed between the internal piston (542) and the external piston (541).

13 Claims, 5 Drawing Sheets

AMPLITUDE SENSITIVE HYDRAULIC DAMPER

The present invention relates to a hydraulic damper, in particular a damper of a motor vehicle suspension, comprising a tube filled with working liquid, inside of which a slidable piston assembly attached to a piston rod led outside the damper through a sealed piston rod guide is disposed, said piston assembly forming at least one valve assembly of the damper, wherein each valve assembly of the damper separates the damper into a main compression chamber and a main rebound chamber and is provided with rebound and compression valve assemblies to control the flow of working liquid passing through it during rebound and compression stroke of the damper.

Typical damper characteristic of damping force vs. piston velocity is usually designed as a trade-off between improvement of the car handling properties and reduction of undesirable car vibrations (a so called vibration isolation or NVH—Noise, Vibration, Harshness requirements). There is a need to achieve different rates of piston damping force in dependence of the piston velocity, where for low piston velocities observable e.g. during vehicle cornering manoeuvres the damping force would increase rapidly, while for larger piston velocities observable e.g. when the vehicle travels over boulder paving, the damper would provide smaller rates of increase of the damping force in a quasi sigmoid characteristic of damping force vs. piston velocity.

European patent publication EP 1152166 discloses a hydraulic damper comprising an additional chamber which is mounted on a piston rod and provided with a diaphragm or displaceable rigid disk. The diaphragm separates the chamber into an additional compression chamber and an additional rebound chamber that are in hydraulic communication respectively with the main compression chamber and the main rebound chamber by means of appropriate channels in the piston rod and the main piston assembly. The diaphragm or disc displaces in the chamber, handling low amplitude vibrations so that damping forces are weak. After further diaphragm displacement is no longer possible, higher amplitudes are handled by the valves of the main piston assembly and attenuation is harder.

Such a solution with a slidable partition is known as "a damper within a damper" or Amplitude Sensitive Damping (ASD) and allows to control damping performance at lower (slidable diaphragm) and higher (regular valves) excitation amplitudes independently.

In order to enhance damping forces of ASD systems it has been proposed in the state of art to use springs supporting slidable partition disposed in an additional pressure chamber.

An exemplary damper of this kind is disclosed in Japanese patent application JP2006336816 describing an improved shock absorbing device having adjustable damping properties. The shock absorbing device comprises a first passage and a second passage for communicating two operating chambers with each other, a pressure chamber provided on the way of the second passage, a free piston to be inserted into the pressure chamber, and a spring for generating energizing force in the free piston in proportion thereto to suppress the displacement of the free piston.

Patent specification U.S. Pat. No. 7,156,214 discloses a switchable ASD damper with a bypass connecting main compression or main rebound chamber of the damper respectively with additional compression or additional rebound chamber in a housing in which an axially movable partition separates these additional chambers, the bypass being controlled by a switchable solenoid valve.

Though systems, according to preamble of claim 1, having an additional pressure chamber with a slidable partition comprising a piston supported by springs improve overall level of ride comfort, the neutral position of the partition is determined by the equilibrium of the forces generated on the partition by serially disposed and counter-operating springs resting on the opposite walls of the additional pressure chamber. In this position however, each pressure difference between the sides of the partition will cause the partition to displace from its equilibrium position so that it is impossible for the ASD arrangement to activate only after predefined threshold of pressure difference between the additional compression chamber and an additional rebound chamber. In other words, in absence of any externally controlled switchable valve, ASD arrangement is always active.

Furthermore most prior art solutions enable only for achieving a substantially symmetric characteristic of a damping force vs. piston displacement, which results from joined action of the springs supporting opposite compression and rebound sides of the slidable partition.

It has been an object of the present invention to overcome the above mentioned problems providing an improved hydraulic damper with an amplitude selective damping arrangement that would enable to predefine the forces of activation of the ASD arrangement, and moreover to be able to predefine them independently for a rebound and compression side, in order to adjust force vs. piston velocity as well as force vs. piston displacement characteristics of a damper independently for its compression and rebound stroke.

According to the invention, in a hydraulic damper mentioned in the outset and comprising at least one chamber in which a slidable partition assembly separating this chamber into an additional compression chamber hydraulically connected with a main compression chamber and an additional rebound chamber hydraulically connected with a main rebound chamber, which slidable partition assembly comprises a piston making a sliding fit with the inner surface of the chamber and at least one spring supporting the piston, said slidable partition assembly additionally comprises at least one internal piston disposed slidably within the external piston and supported by an internal spring disposed between said internal piston and said external piston.

Preferably springs supporting the pistons of said slidable partition assembly act in the opposite directions.

Preferably said internal piston is provided with a projection that in a neutral state of the slidable partition assembly projects from the opening of said external piston biased by the internal spring.

In such a case said projection is preferably provided with cutouts.

Preferably said at least one piston of said slidable partition assembly is provided with a distancing projection.

Said a distancing projection prevents against excessive compression of the spring supporting that piston.

Preferably said at least one piston of said slidable partition assembly is floating that is not only slidable but also free to rotate around the axis of slide.

Preferably said internal spring is supported on the thrust ring seated in the interior surface of the external piston.

Preferably said at least one piston of said slidable partition assembly is provided with an external circumferential projection supporting the spring.

In such a case preferably an O-ring is disposed inside the groove formed in said external circumferential projection.

Preferably the damper according to the invention additionally comprises at least one switchable valve for controlling hydraulic connection between said main compression chamber and said additional compression chamber and/or between said main rebound chamber and said additional rebound chamber.

The principles and exemplary embodiments of the invention are presented below in connection with the attached drawings on which.

Figures 1, 2:
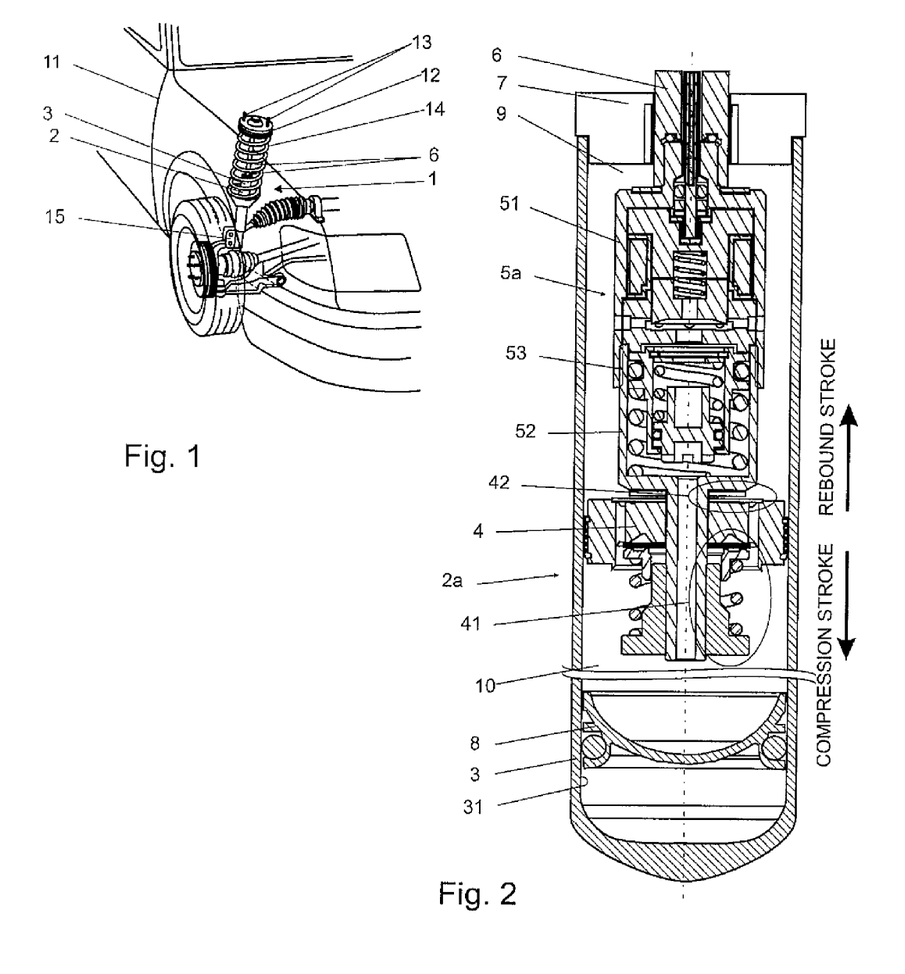
FIG. 1 schematically illustrates a front right motor vehicle suspension.
FIG. 2 is a schematic cross-sectional view of an exemplary mono-tube hydraulic damper showing its main components and provided with a first embodiment of an additional chamber according to the present invention.

FIG. 1 schematically illustrates a fragment of an exemplary vehicle suspension 1 attached to a vehicle chassis 11 by means of a top mount 12 and a number of screws 13 disposed on the periphery of the upper surface of the top mount 12. The top mount 12 is connected to a coil spring 14 and a rod 6 of a mono- or twin-tube hydraulic damper 2. The tube 3 of the damper 2 is filled with working liquid inside of which a piston assembly attached to the damper rod 6 led outside the tube 3 is slidably disposed. At the other end the damper 2 tube 3 is connected to the steering knuckle 15 supporting the vehicle wheel.

A hydraulic damper 2a shown in FIG. 2 is an example of a mono-tube damper that may be employed in a vehicle suspension 1 presented in FIG. 1. It comprises a tube 3 filled with working liquid, inside of which a movable piston assembly 4, cooperating with a rod 6 led axially outside the damper 2a through a seated rod guide 7, is slidably disposed making a sliding fit with the inner surface 31 of the tube 3. The piston assembly 4 divides the tube 3 into a main rebound chamber 9 and a main compression chamber 10 and comprises rebound 41 and compression 42 valve assemblies and with appropriate flow passages to control the flow of working liquid passing through the piston assembly 4 during the rebound and the compression stroke of the damper 2a. At the other end, the tube 3 is closed by the floating gas cup assembly 8 for pressure compensation.

All above features of the damper, such as the tube 3, the piston assembly 4, the rod 6 and the rod guide 7 as well as the floating gas cup assembly 8 may have a typical design known to persons skilled in the art and shall not be described in detail.

The term "rebound" as used in this specification with reference to particular elements of the damper means these elements or these parts of particular elements which point toward the piston rod or in a case of a flow direction of the working liquid it refers to this flow direction that takes place during the rebound stroke of a damper. Similarly the term "compression" as used herein with reference to particular elements of the damper means these elements or parts of elements which point in a direction opposite to the piston rod or in a case of a flow direction of the working liquid it refers to this flow direction that takes place during the compression stroke of a damper.

The piston assembly 4 is attached to the rod 6 via an additional pressure chamber 5a composed of two hollow cylindrical cup-like parts 51, 52 joined together by a threaded connection 53.

Figure 3:
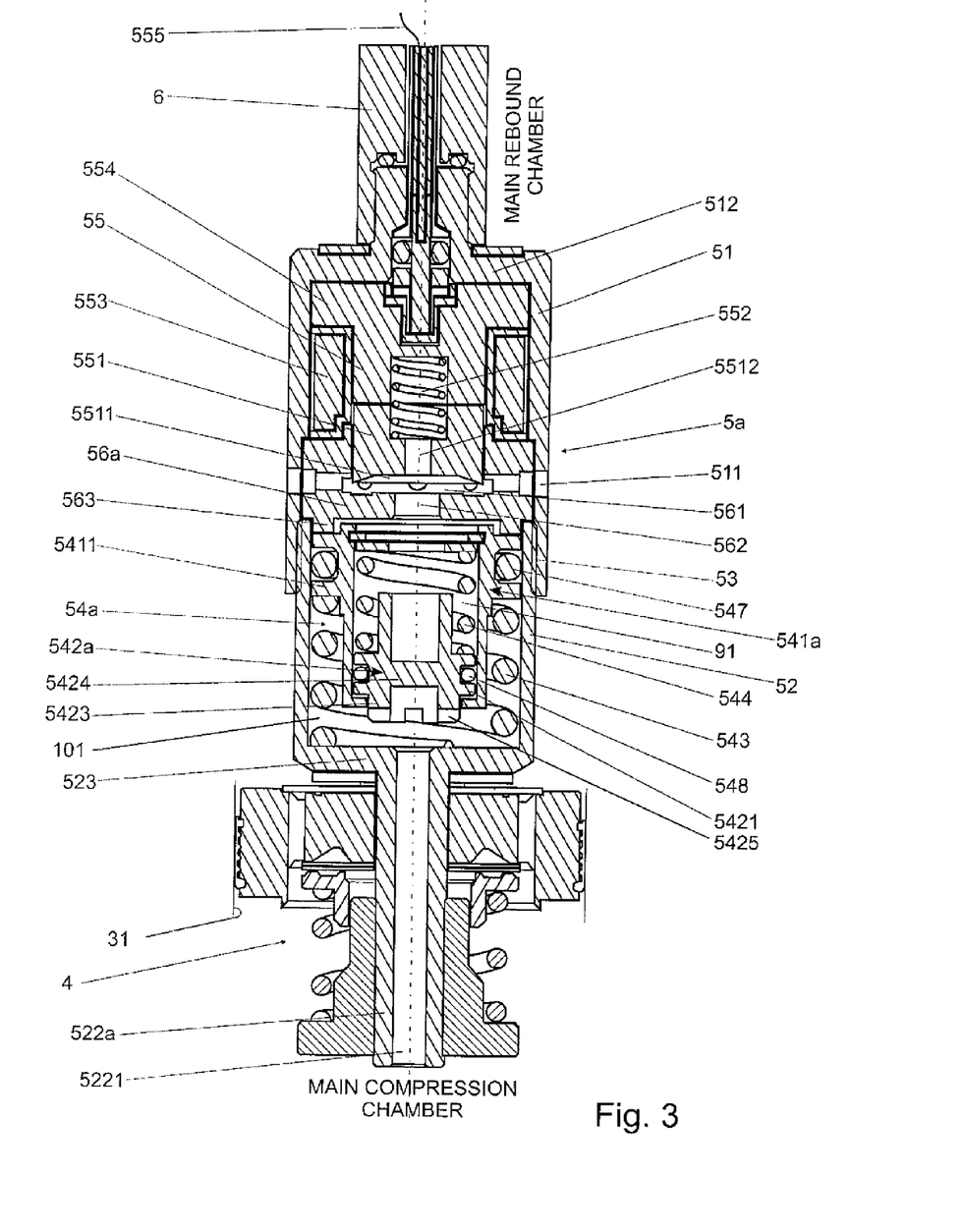
FIG. 3 a schematic cross-sectional view depicting main components of a first embodiment of an additional chamber shown in FIG. 2 in an initial position.

As shown in FIG. 3 inside the chamber 5a a slidable partition assembly 54a having an external slidable piston 541a and an internal slidable piston 542a is disposed. The additional pressure chamber 5a provides an amplitude sensitiveness property of the damper 2a.

The first cup-like part 51 of the chamber 5a is screwed into the end part of the rod 6. In the side wall of the first part 51 a number of transverse through radial openings 511 are formed which are arranged equiangularly over the circumference of the side wall of the first part 51. Openings 511 enable flow communication of the main rebound chamber 9 with an additional rebound chamber 91 via a cylindrical hollow chamber 561 and an axial through opening 562 formed inside a block component 56a.

A movable armature 551 of an electromagnet 55 is disposed in the cylindrical hollow chamber 561. In its normal position that is in an inactive state of the electromagnet 55, the circumferential edge 5511 of the armature 551 is pressed by a spring 552 against a surface of the circumferential groove formed in the bottom of the hollow chamber 561. In a result, in an inactive state of the electromagnet 55, a hydraulic communication between transverse openings 511 and axial opening 562 is blocked. While the electromagnet 55 is activated, the current supplied by electric cable 555 and flowing in winding 553 causes the armature 551 to be magnetized to the electromagnet core 554 thus unblocking hydraulic connection between the main rebound chamber 9 and the additional rebound chamber 91. In order to enable smooth displacement of the armature 551 of the electromagnet 55, the armature 551 is provided with a through opening 5512 for hydraulic pressure balance. A set formed by the stack of the electromagnet core 554, the electromagnet winding 553 and the block component 56a rests at one side at the bottom 512 of the first cup-like part 51 and on the other side at the periphery area of the block component 56a supported on the upper face of the side wall of the second cup-like part 52.

The second cup-like part 52 is provided with an axial tenon 522a, projecting from the centre of the bottom 523 of the part 52, to which the partition assembly 54a is fixed.

The block component 56a is provided with a circumferential projection 563 forming a resistance surface for the external piston 541a in a compression final position and an initial position of the slidable partition assembly 54a. In the interior of the second cup-like part 52 closed by the block component 56a two slidably-mounted pistons 541a and 542a are arranged.

Pistons 541a, 542a divide the additional pressure chamber 5a into the additional rebound chamber 91, as explained above, and an additional compression chamber 101 which is in a hydraulic communication with the main compression chamber 10 via an axial through channel 5221 formed in the tenon 522a.

The external piston 541a is a hollow cup-shaped element provided with an external circumferential projection 5411 having a groove inside of which an O-ring 547 is disposed. The projection 5411 also provides a resistance surface for an external spring 543. At the other end, the external spring 543 rests on the bottom 523 of the cup-like part 52 and during operation generates biasing force pushing the external piston 541a away from the bottom 523 of the second part 52, so that in the initial position (FIG. 3) or in the compression final position (FIG. 4a), the external piston 541a is pressed by the external spring 543 to the circumferential projection 563 of the block component 56a.

The internal piston 542a is also a cup-shaped element having a disc-like portion 5424 with two axial projections 5422 and 5423. The piston 542a is also provided with an external circumferential projection 5421 having a groove inside of which an O-ring 548 is disposed. The internal piston 542a, the internal spring 544, a slidable ring 545 and a thrust ring 546 are arranged in the hollow interior space of the external piston 541a.

Figure 4A:
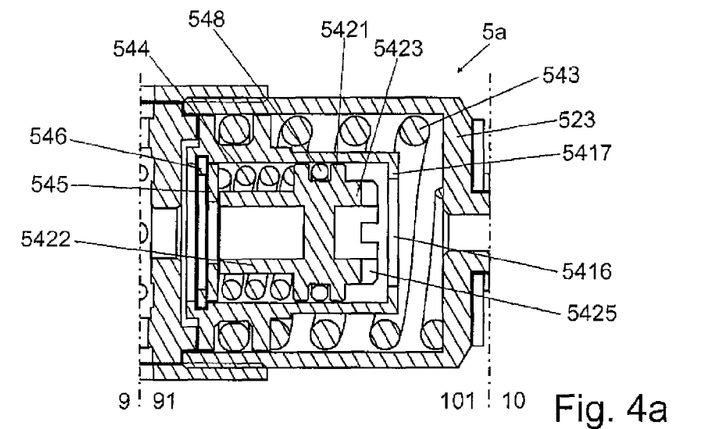
FIGS. 4a-4c show enlarged fragmentary cross-sectional views of the first embodiment of the additional chamber shown in FIG. 2, respectively in a compression final position (FIG. 4a), an intermediate position (FIG. 4b) and a rebound final position (FIG. 4c)
Figure 4B:
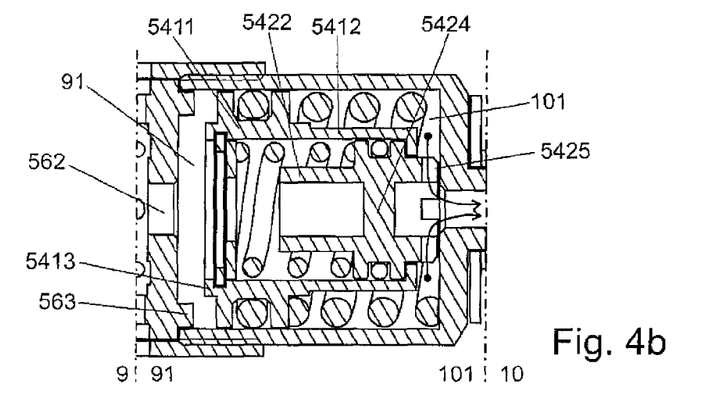
Figure 4C:
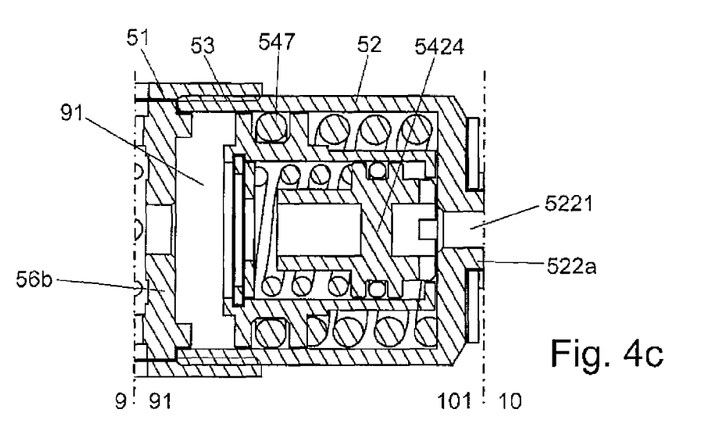

As shown in FIG. 4a-4c, the internal spring 544, supported by the thrust ring 546 seated in the interior surface of the external piston 541a, generates bias force pressing the piston 542a towards the bottom 5417 of the cup-like part or projection 5412 of the external piston 541a, so that at the initial position of the slidable partition assembly 54a the second axial projection 5423 of the internal piston 542a is led through the opening 5416 formed in the bottom 5417 of the cup-like part 5412 of the external piston 541a. The bottom surface of the second projection 5423 of the internal piston 542a is also provided with radial cutouts 5425, the function of which is described with reference to FIGS. 4b, 4c.

The first axial projection 5422 of the internal piston 542a serves as a distancing element defining maximum insertion of the internal piston 542a until it abuts on the ring 545. The first projection 5422 also prevents against excessive compression of the internal spring 544, similarly as appropriate length of the first projection 5412 of the external piston 541a prevents against excessive compression of the external spring 543.

The slidable partition assembly 54a of the damper 2a is shown in FIG. 3 in an initial or neutral position, i.e. in a state of equilibrium between the pressures in the main rebound 9 and the main compression 10 chambers. Obviously such equilibrium rarely happens while the damper 2a is in operation.

Some characteristic positions of the additional pressure chamber 5a shall now be described with reference to FIGS. 4a, 4c, wherein the term "pressure difference" denotes the difference between the pressures in the additional compression chamber 101 and in the additional rebound chamber 91, so that the pressure difference is positive if the pressure in the additional compression chamber 101 is higher than the pressure in the additional rebound chamber 91 and negative if it is otherwise.

FIG. 4a shows the slidable partition assembly 54a in the compression final position, where the internal piston 542a achieved its maximum insertion due to high positive pressure difference. Displacement of the internal piston 542a began when the positive pressure difference exceeded the predetermined preload of the internal spring 544. Obviously in the compression final position only the internal piston 542a is displaced while the external piston 541a is pressed to the circumferential projection 563 of the block component 56a by the preload of the external spring 543.

In an intermediate position shown in FIG. 4b the pressure difference between the chambers 101 and 91 is negative and exceeds the preload of the external spring 543. As illustrated, the external piston 541a is now moving toward the bottom 523 of the second cup-like part 52, wherein the internal piston 542a already achieved its final position under the negative pressure difference. The second projection 5423 of the internal piston 542a projects from the opening 5416, while the working liquid flows out of the additional compression chamber 101 through the radial cutouts 5425.

With an increase of the negative pressure difference the slidable partition assembly 54a will reach the rebound final position shown in FIG. 4c, where both the second projection 5423 of the internal piston 542a and the first projection 5412 of the external piston 541a rest on the bottom 523 of the second cup-like part 52, so that the outlet of the channel 5221 of the tenon 522a and the cutouts 5425 are blocked.

Figure 5:
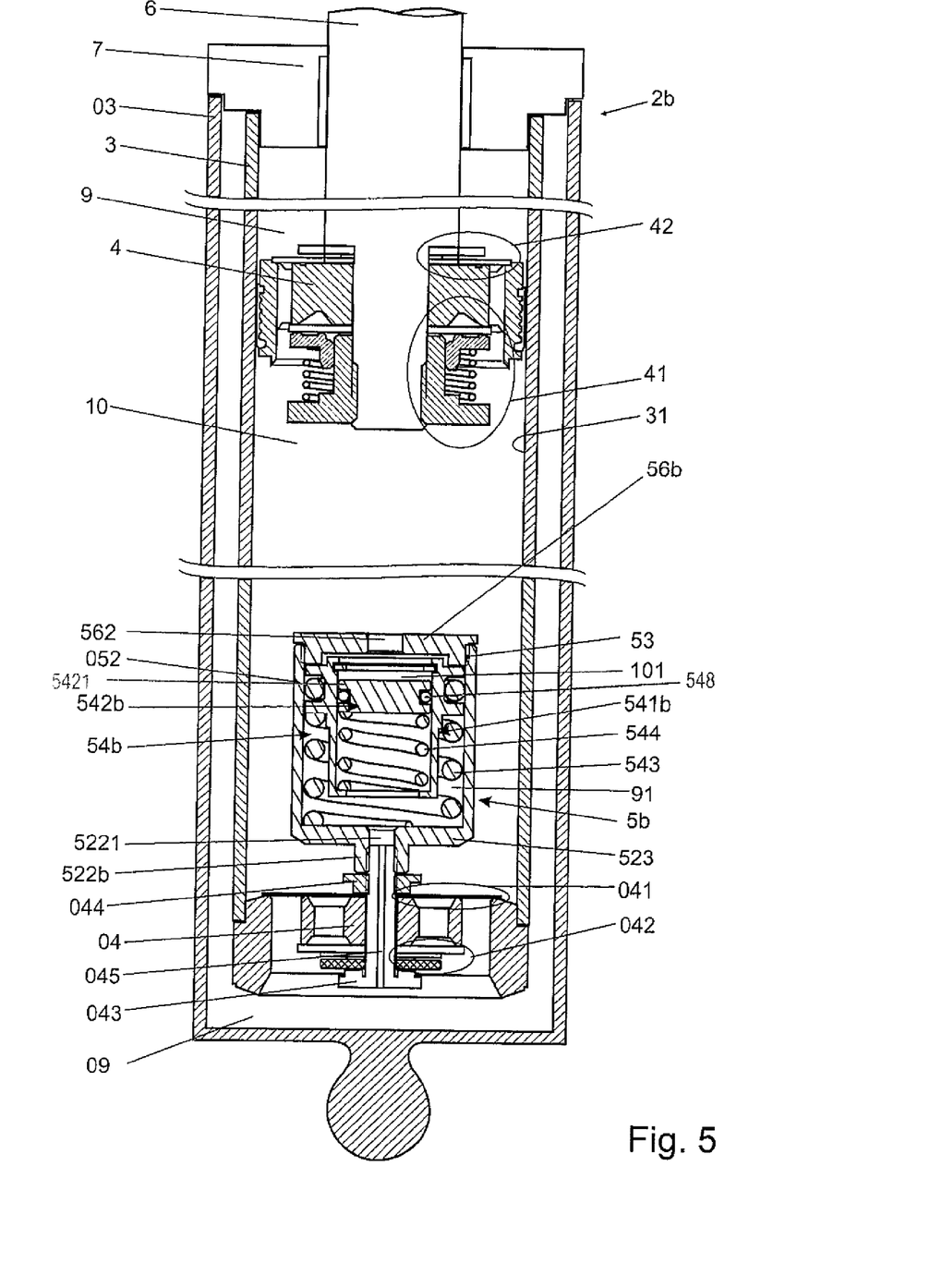
FIG. 5 is a schematic cross-sectional view of an exemplary twin-tube hydraulic damper showing its main components and provided with another embodiment of an additional chamber according to the present invention.
Figure 7:
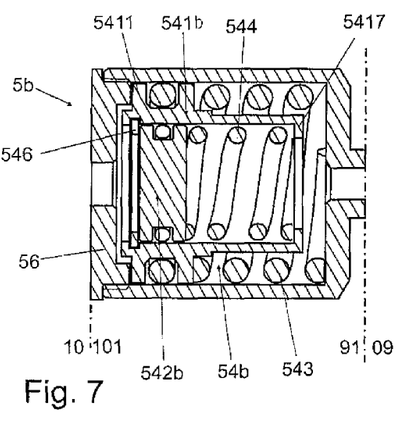
FIG. 7 is an enlarged cross-section of the additional chamber of the twin-tube damper shown in FIG. 5.

FIG. 5 and FIG. 7 illustrate another embodiment of the present invention in a twin-tube hydraulic damper 2b wherein numerical references of functionally corresponding elements remain the same. The damper 2b comprises an external tube 03 and an internal tube 3 inside of which a piston assembly 4 attached to a piston rod 6 led outside the damper through a sealed piston rod guide 7 is disposed. The piston assembly 4 forms a first valve assembly of the damper 2b. A base valve assembly 04 closing the internal tube 3 forms a second valve assembly of the damper and to this end comprises rebound 041 and compression 042 valve assemblies with appropriate flow passages, to control the flow of working liquid passing during the rebound and the compression stroke of the damper 2b through the base valve assembly 04. The base valve assembly 04 also divides the damper into a main compression chamber 10 between the rebound side of the base valve assembly 04 and the compression side of the piston assembly 4 and a reservoir chamber 09 defined between the internal and external tubes 3 and 03.

Concerning operation of the damper 2b, the reservoir chamber 09 of the base valve assembly 04 functionally corresponds to the main rebound chamber 9 of the piston valve assembly 4 since during compression stroke of the damper 2b working fluid flows from the main compression chamber 10 both to the main rebound chamber 9 of the piston assembly 4 as well as to this main rebound chamber 09 of the valve assembly 04. All the above features of a twin tube damper are well known to persons skilled in the art and shall not be described in detail.

The valve assemblies 041 and 042 of the second valve assembly 04 are secured to the base valve assembly 04 by means of a bolt 043 and a washer 044 screwed on the bolt 043 having an axial through channel 045. An additional pressure chamber 5b is screwed at the rebound side of the bolt 043. The additional chamber 5b comprises a second cup-like part 052 provided with an axial tenon 522b projecting from the centre of its bottom 523 and is closed at the opposite side by means of a block component 56b fixed to the part 052 by means of a threaded connection 53. The end part of the through channel 5221 of the tenon 522b is internally threaded and screwed onto the threaded end of the bolt 043 of the base valve assembly 04.

In this embodiment, the additional pressure chamber is separated by means of a slidable partition assembly 54b into an additional compression chamber 101 in fluid communication, via an axial through opening 562 of the block component 56b, with the main compression chamber 10 and an additional rebound chamber 91 in fluid communication, via through channel 5221 of the tenon 522b and an axial through channel 045 formed centrally in the bolt 043, with the main rebound chamber 09.

The slidable partition assembly 54b comprises an external slidable piston 541b biased by an external spring 543 and an internal slidable piston 542b biased by an internal spring 544 supported in the external piston 541 by a thrust ring 546. The construction of the external piston 541b is the same as the construction of the external piston 541a of the first embodiment, while the internal piston 542b has a form of a disc provided with an external circumferential projection 5421 with a groove in which an O-ring 548 is settled.

In this case, the internal spring 544 acts in the same direction as the external spring 543, so that the assembly 54b is active only during a damper compression stroke where positive pressure difference displaces both the external piston 541b and the internal piston 542b against preloads of the springs 543 and 544.

In this embodiment the damper 2b lacks any electromagnet arrangement for setting deactivation mode of additional chamber operation so that ASD functionality is always active, mainly during damper compression stroke.

Figure 6:
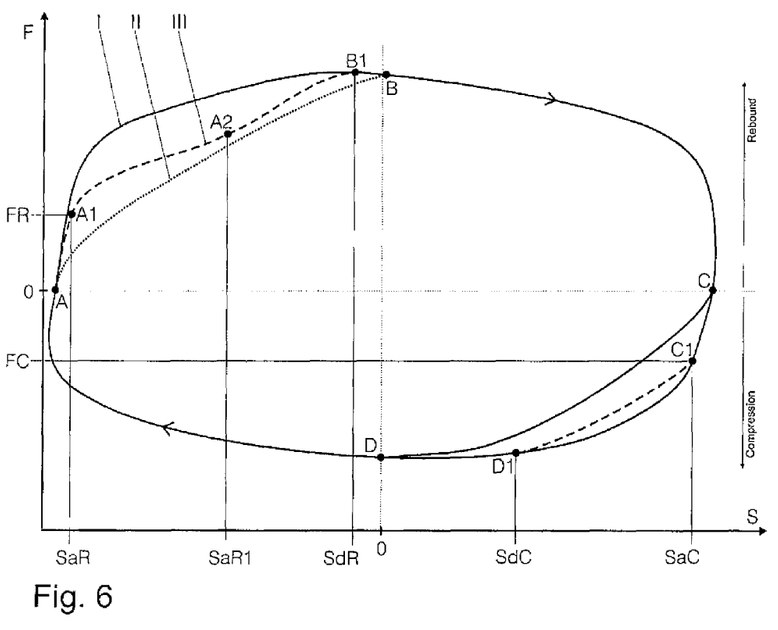
FIG. 6 shows a group of force vs. piston displacement characteristics of a typical damper without an ASD arrangement, a damper provided with a typical ASD spring arrangement (such as the one disclosed in U.S. Pat. No. 7,156,214), and exemplary mono-tube damper according to the present invention shown in FIGS. 2-4.

FIG. 6 schematically shows force (F) vs. piston stroke (S) relationships for different examples of prior art dampers and damper provided with the additional pressure chamber 5a of the present invention. For each damper, the damping force is equal to zero at the ends A, C of the rebound and compression strokes, i.e. at the extreme positions of the piston assembly within the damper tube, and reaches its maximum values about the middle of the stroke. The surface surrounded by the force vs. stroke curve is equal to the work of a damper or the amount of energy dissipated by a damper during one cycle. All curves are plotted for the same input velocity of the piston assembly.

Curve I shows a characteristic of a typical known damper without an additional pressure chamber.

Curve II shows a characteristic of a typical damper provided with an additional pressure chamber with a switchable valve in an active mode of operation, such as the one disclosed in document U.S. Pat. No. 7,156,214, which provides symmetrical decrease of damping forces during the first phases of rebound and compression strokes. Sections A-B and C-D of the curve II result from the stiffness of springs supporting a slidable partition assembly dividing the pressure chamber into an additional rebound chamber and an additional compression chamber.

Curve III is a characteristic of the mono-tube damper 2a according to the present invention shown in FIG. 2. In this case activation threshold SaR for the rebound stroke and SaC for the compression strokes are determined by setting preload values FR and FC of springs 543 and 544. During the rebound stroke section A1-A2 correspond to the stiffness of the external spring 543, SaR1 is the activation threshold of the internal piston 542 at the point in which it abuts to the bottom 523 of the second cup-like part 52, as shown in FIG. 4b, and section A2-B1 correspond to the combined stiffness of the external spring 543 and the internal spring 544. Section C1-D1 during damper compression stroke correspond to the stiffness of the internal spring 544.

Since suitable preload values FR and FC of the springs 543, 544 may be easily set by adjusting the springs it is possible to construct a damper with an arbitrary intermediate force vs piston displacement characteristic in the area delimited by the curves I and II.

FIG. 7 shows details of the slidable partition assembly 54b in the rebound final position.

Figure 8:
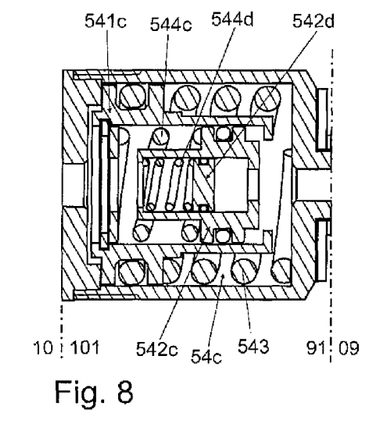
FIG. 8 shows yet another embodiment of an additional chamber according to the present invention.

FIG. 8 shows yet another embodiment of a slidable partition assembly 54c, comprising an internal piston 542c inside of which another floating (i.e. free to slide and rotate around the axis of slide) piston 542d is arranged and supported by an internal spring 544d in the piston 542c. In this embodiment all pistons 542 act independently on each other reacting to pressure difference changes between the additional rebound 91 and additional compression chamber 101 providing yet additional possibility of adjusting damping characteristics.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper (2), in particular a damper of a motor vehicle suspension, comprising:
    a tube filled with working liquid, inside of which a slidable piston assembly (4) attached to a piston rod (6) led outside the damper (2) through a sealed piston rod guide (7) is disposed,
    said piston assembly forming at least one valve assembly of the damper, wherein each valve assembly (4, 04) of the damper separates the damper into a main compression chamber (10) and a main rebound chamber (9, 09) and is provided with rebound (41, 041) and compression (42, 042) valve assemblies to control the flow of working liquid passing through the at least one valve assembly during rebound and compression stroke of the damper (2),
    a slidable partition assembly (54) disposed within an additional pressure chamber (5a) and including an external piston (541) making a sliding fit with an inner surface of said additional pressure chamber (5a), said external piston (541) supported by and biased towards the main rebound chamber (9, 09) by at least one spring (543),
    said slidable partition assembly (54) additionally including at least one internal piston (542) disposed slidably within said external piston (541) and supported by and biased towards the main compression chamber (10) by an internal spring (544) disposed between said internal piston (542) and said external piston (541),
    said external piston (541) defining an additional compression chamber (101) disposed between said external piston (541) and said inner wall of said additional pressure chamber (5a) and hydraulically connected with the main compression chamber (10), and
    said internal piston (542) defining an additional rebound chamber (91) disposed between said internal piston (542) and said external piston (541) and hydraulically connected with the the main rebound chamber (9, 09).

2. The hydraulic damper according to claim 1 wherein said internal piston (542) is provided with a projection (5423) that in a neutral state of the slidable partition assembly (54) projects from the opening (5416) of said external piston (541) biased by the internal spring (544).

3. The hydraulic damper according to claim 2 wherein said projection (5423) is provided with cutouts (5425).

4. The hydraulic damper according to claim 1 wherein said external piston (541) and said internal piston (542) of said slidable partition assembly (54) are each provided with a distancing element (5412, 5422).

5. The hydraulic damper according to claim 1 wherein said external piston (541) and said internal piston (542) of said slidable partition assembly (54) are each floating.

6. The hydraulic damper according to claim 1 wherein said internal spring (544) is supported on a thrust ring (546) seated in the interior surface of the external piston (541).

7. The hydraulic damper according to claim 1 wherein said said external piston (541) and said internal piston (542) of said slidable partition assembly (54) are each provided with an external circumferential projection (5411, 5421) supporting the respective spring (543, 544).

8. The hydraulic damper according to claim 7 wherein an O-ring (547, 548) is disposed inside the groove formed in said external circumferential projection (5411, 5421).

9. The hydraulic damper according to claim 1 further comprising at least one switchable valve (55) for controlling hydraulic connection between said main compression chamber (10) and said additional compression chamber (101) and/or between said main rebound chamber (9, 09) and said additional rebound chamber (91).

10. The hydraulic damper according to claim 1 wherein said additional pressure chamber (5*a*) includes a pair of cup-like parts (51, 52) interconnected to one another.

11. The hydraulic damper according to claim 1 wherein said additional pressure chamber (5*a*) is disposed between and interconnects the sliable piston assembly (4) to the piston rod (6).

12. The hydraulic damper according to claim 10 wherein a first cup-like part (51) of said pair of cup-like parts (51, 52) is interconnected to said piston rod (6) and defines a plurality of radial openings (511) for establishing the hydraulic connection between the additional rebound chamber (91) and the main rebound chamber (9).

13. The hydraulic damper according to claim 10 wherein a second cup-like part (52) of said pair of cup-like parts (51, 52) includes an axial tenon (522*a*) defining an axial through channel (5221) for establishing the hydraulic connection between the additional compression chamber (101) and the main compression chamber (10).

* * * * *